US012158946B2

(12) United States Patent
Nambannor Kunnath et al.

(10) Patent No.: US 12,158,946 B2
(45) Date of Patent: Dec. 3, 2024

(54) SHARING ENTERPRISE RESOURCES WITH TEMPORARY USERS

(71) Applicant: VMWARE, INC., Palo Alto, CA (US)

(72) Inventors: Ramanandan Nambannor Kunnath, Bangalore (IN); Rohit Pradeep Shetty, Bangalore (IN); Erich Stuntebeck, Atlanta, GA (US); Ramani Panchapakesan, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 232 days.

(21) Appl. No.: 17/692,215

(22) Filed: Mar. 11, 2022

(65) Prior Publication Data

US 2023/0222205 A1 Jul. 13, 2023

(30) Foreign Application Priority Data

Jan. 13, 2022 (IN) .............................. 202241002160

(51) Int. Cl.
*G06F 21/45* (2013.01)

(52) U.S. Cl.
CPC ...... *G06F 21/45* (2013.01); *G06F 2221/2149* (2013.01)

(58) Field of Classification Search
CPC ... G06F 21/31; G06F 21/45; G06F 2221/2149
See application file for complete search history.

(56) References Cited

U.S. PATENT DOCUMENTS

| 9,462,003 | B2* | 10/2016 | Liu ...................... H04L 9/3228 |
| 2013/0232239 | A1* | 9/2013 | Akiyama ............ H04L 41/0889 709/220 |
| 2017/0099597 | A1* | 4/2017 | Choi ..................... H04W 8/005 |
| 2018/0077149 | A1* | 3/2018 | Rykowski ............. H04L 9/3242 |
| 2018/0337906 | A1* | 11/2018 | Spektor .................. G06F 21/33 |
| 2023/0222205 | A1* | 7/2023 | Nambannor Kunnath .................. G06F 21/45 726/6 |

* cited by examiner

*Primary Examiner* — Dao Q Ho
(74) *Attorney, Agent, or Firm* — Kim & Stewart LLP

(57) ABSTRACT

Disclosed are various embodiments for delegating administrator tasks from a primary administrator to a secondary administrator. A secondary administrator can create a temporary user account and cause a temporary client device to be enrolled with a management service. The temporary user and/or temporary client device can be provided with access to certain enterprise resources to which the secondary administrator is empowered to grant access.

20 Claims, 4 Drawing Sheets

SHARING ENTERPRISE RESOURCES WITH TEMPORARY USERS

RELATED APPLICATION

Benefit is claimed under 35 U.S.C. 119(a)-(d) to Foreign Application Serial No. 202241002160 filed in India entitled "SHARING ENTERPRISE RESOURCES WITH TEMPORARY USERS", on Jan. 13, 2022, by VMware, Inc., which is herein incorporated in its entirety by reference for all purposes.

BACKGROUND

In a bring-your-own-device (BYOD) or an enterprise-issued device environment, enterprise users can enroll their client devices, such as smartphones, tablets, or other computing devices, as managed devices with a management service. The management service can manage the device by causing applications, policies, configuration profiles, and other data to be pushed to a managed device. However, the management service, in general, can only manage devices that are explicitly enrolled by a user or an administrator with the management service.

In certain enterprise scenarios, temporary users, such as visitors to an enterprise site, can have a need to access enterprise resources that are only available to managed devices. For example, access to an enterprise Wi-Fi network might only be available to client devices that possess a certificate or profile that provides the device with access to the network. As another example, an employee or user with a managed device might wish to share a file or network resource that is reserved to managed devices. However, such an interaction might be a short term interaction that only requires a limited set of resources to be provided to the temporary user for a short period of time Additionally, requiring the involvement of an enterprise administrator into such a scenario can strain potentially limited resources and time of an enterprise information technology time. Additionally, providing the resources can be a time-consuming process that might require various approvals from various stakeholders, increasing the administrative complexity of the interaction.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure is related to empowering certain users with an enterprise with as secondary administrative users, or secondary administrator. An enterprise information technology (IT) administrator can designate a secondary administrator can issue special access shared tokens that can allow the secondary administrator to provision temporary user accounts, cause policies, certificates, data, applications, and information to be provisioned onto a client device of a temporary user. The secondary administrator can take such an action without requiring involvement of a primary administrator.

The secondary administrator can be empowered to take a limited set of actions on behalf of a temporary user. The limited set of actions can be configured by a primary administrator. By empowering a secondary administrator, the primary administrator can avoid having to onboard temporary users because the onboarding process can be delegated to secondary administrators. For example, a user at a reception desk can onboard a temporary user under the authority of a primary administrator to provide a Wi-Fi certificate to a visitor. The primary administrator can delegate such authority to a user working at the reception desk, thereby avoiding the requirement of the primary administrator to onboard the temporary user and provide the Wi-Fi certificate to the user.

As another example, an employee of an enterprise may want to temporarily share with a visitor access to a file sharing service utilized by the enterprise that requires the visitor's device to be enrolled as a managed device with a management service. Again, the primary administrator can delegate such authority to a secondary administrator so that the secondary administrator can provide credentials to the visitor's device so that the device can be enrolled with the management service without requiring the primary administrator to provision the temporary user or the device of the temporary user.

Examples of the disclosure operate by allowing a primary administrator to delegate certain administrator capabilities to a secondary administrator. The secondary administrator can authorize a temporary user and/or a client device of the temporary user to access enterprise resources to which the primary administrator has determined that the secondary administrator is able to provide access. A secondary administrator can utilize an application on a managed device assigned to the secondary administrator to onboard new temporary users and provide credentials that enable a temporary user to enroll their respective device as a managed device with the enterprise management service.

Figure 1:
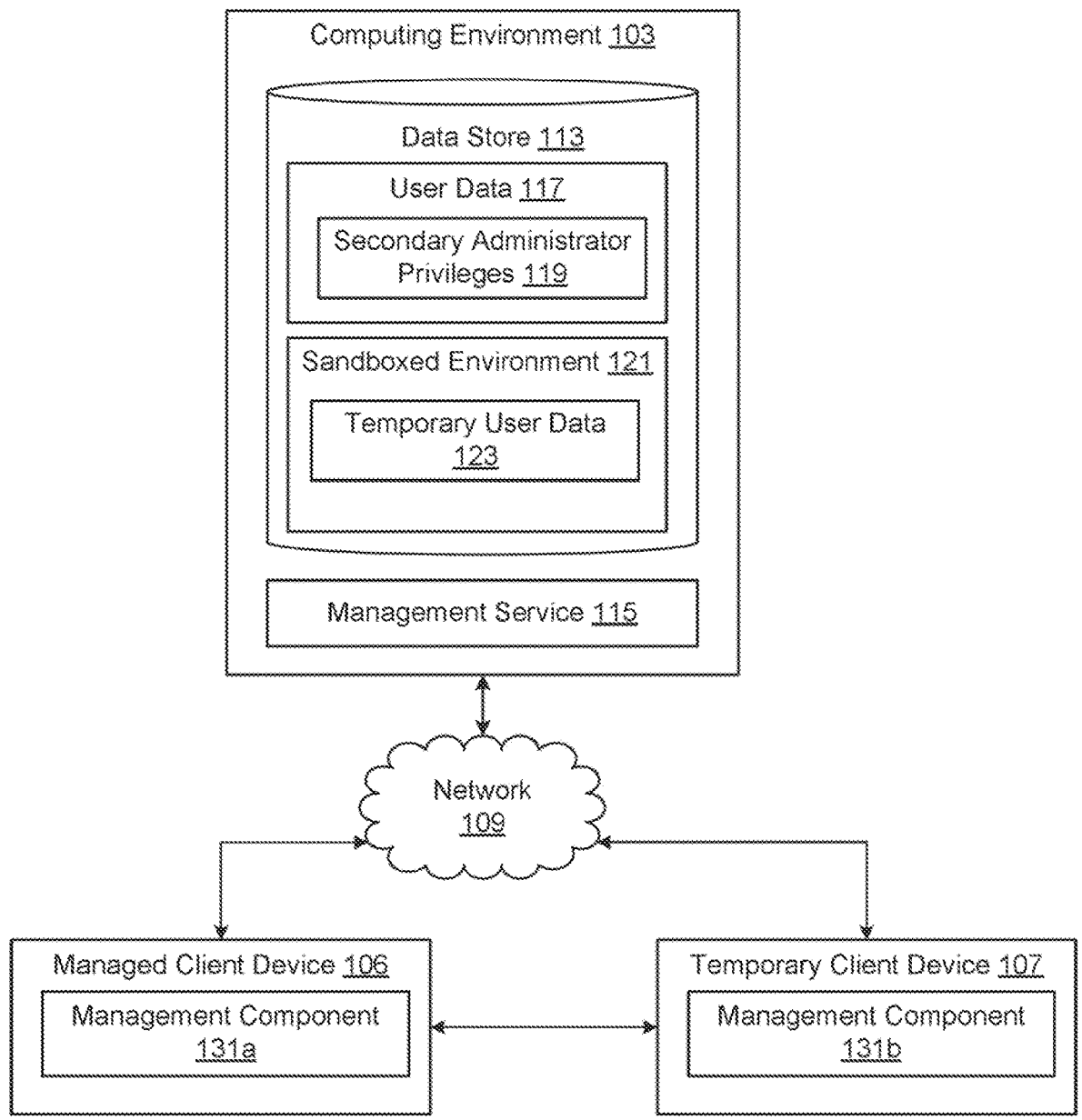
FIG. 1 is a drawing of a networked environment according to various embodiments of the present disclosure.

With reference to FIG. 1, shown is a networked environment 100 according to various embodiments. The networked environment 100 includes a computing environment 103, a managed client device 106, and a temporary client device 107, which are in data communication with each other via a network 109. The network 109 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks.

The computing environment 103 can comprise, for example, a server computer or any other system providing computing capability. Alternatively, the computing environment 103 can employ a plurality of computing devices that can be arranged, for example, in one or more server banks, computer banks, or other arrangements. Such computing devices can be located in a single installation or can be distributed among many different geographical locations. For example, the computing environment 103 can include a plurality of computing devices that together can comprise a hosted computing resource, a grid computing resource, and/or any other distributed computing arrangement. In some cases, the computing environment 103 can correspond to an elastic computing resource where the allotted capacity of processing, network, storage, or other computing-related resources can vary over time. The computing environment 103 can also include or correspond to one or more virtualized server instances that are created in order to execute the functionality that is described herein.

Various applications or other functionality can be executed in the computing environment 103 according to various embodiments. Also, various data is stored in a data store 113 that is accessible to the computing environment 103. The data store 113 can be representative of a plurality of data stores 113 as can be appreciated. The data stored in the data store 113, for example, is associated with the operation of the various applications and/or functional entities described below.

The components executed on the computing environment 103, for example, can include a management service 115 and other applications, services, processes, systems, engines, or functionality not discussed in detail herein. The management service 115 can manage and/or oversee the operation of multiple managed client devices 106. For example, an enterprise can operate the management service 115 to ensure that the client devices 106 that are enrolled as managed devices are operating in compliance with various compliance rules. By ensuring that the client devices 106 are operated in compliance with the compliance rules, the employer can control and protect access to various data. The management service 115 can also facilitate access to email, calendar data, contact information, documents, or other enterprise data to which an enterprise may wish to provide access by users via client devices 106.

In some embodiments, the management service 115 can also determine compliance of client devices 106 associated with a particular user with compliance rules in response to a request received from an application executed by a managed client device 106. The computing environment 103 can also execute other applications to facilitate interactions with a managed client device 106, such as an application distribution service that distributes applications and/or updates to applications to the managed client device 106, a mail server that provides email services and/or functionality, a document storage application that provides remote document storage capability for users of an enterprise, or other applications or services that an enterprise can deploy to provide services for its users. Description of such applications or services is not necessary for a complete understanding of embodiments of the disclosure.

The management service 115 can cause configuration profiles and other configuration data to be installed on a managed client device 106. For example, certificate profiles that provide a managed client device 106 with access to a certain network can be installed on the managed client device 106 by the management service 115. As another example, the management service 115 can push configuration profiles that include contacts or contact data to the managed client device 106. The management service 115 can rely upon management application programming interfaces (API's) provided by an operating system of the managed client device 106 that allows the management service 115 to remotely manage the client 106. Examples of this disclosure can leverage the management capability provided by the operating system of the managed client device 106 or a temporary client device 107 to install and manage, profiles, applications, files, and other data on a device.

A temporary client device 107 can correspond to a device that is provided access to enterprise resources by a secondary administrator acting using a managed client device 106. The secondary administrator can act under authority delegated by a primary administrator of the management service 115.

For example, the management service 115 can install a certificate or profile that includes credentials to access an enterprise Wi-F network on a managed device. The credentials can be provided to a temporary client device 107 or a managed client device 106 utilizing operating system functionality that permits an application or service appointed as a device administrator to install data onto a managed device.

The management service 115 can also install and/or enforce compliance policies onto a managed client device 106 or a temporary client device 107. A compliance policy can indicate one or more rules or policies that must be followed, such as a prohibition on having certain applications running on the device. A local management agent can enforce compliance policies on behalf of the management service 115.

The management service 115 can also assess the device posture of the managed client device 106 or a user account associated with the managed client device 106. For example, the management service 115 can enable or disable the various capabilities delegated to a secondary administrator based upon whether the managed client device 106 or a user associated with the managed client device 106 is in compliance with compliance rules. If a user's managed client device 106 or a user account of the user is considered out of compliance with one or more compliance rules, the management service 115 can limit or eliminate the ability of the managed client device 106 to create temporary user accounts. The posture of the managed client device 106 can be obtained from the management component 131 running on the managed client device 106, which can assess the compliance of the device with one or more compliance rules and report the compliance status of the managed client device 106 to the management service 115.

The data stored in the data store 113 includes, for example, user data 117, a sandboxed environment 121, and potentially other data. The user data 117 can include data associated with a user account, such as user profile information. User profile information can include information about a user's role within an organization, an office address or location, home address or location, permissions, and/or privileges with respect to usage of an enterprise device.

User data 117 can also include access settings, such as authentication credentials, delegation settings (e.g., information about other users who may be provided access to the user data 117 of a particular user), mail and document retention rules and/or policies, and/or other geographic access restrictions or limitations (e.g., information about certain locations and/or networks from which user data 117 can be accessed). User data 117 can also include other account settings, such as biographical or demographic information about a user, password reset information, multifactor authentication settings, authentication tokens, and other data related to a user account. User data 117 can also include other forms of data associated with users of an enterprise's computing resources that are not shown, such as a user's mailbox data, calendar data, contact data, and information about the various devices, such as device identifiers, that are assigned to the user and managed in some form by the management service 115. For example, mailbox data includes data associated with one or more mailboxes corresponding to a user account of a user.

Calendar data can include, for example, appointments, reminders, tasks and/or other data that can be associated with a timestamp or date stamp. Calendar data can include appointments that are associated with a particular location and/or user. For example, an appointment can be linked with a particular location, meeting room, building, address, or other location. An appointment can also be linked with another user who is internal or external to an organization or domain of the user as well as with text and/or attachments. Calendar data can also include tasks, reminders, or other types of data that can be associated with a time and/or place and placed on a calendar.

User data 117 can also include an indication of whether a user is designated as a secondary administrator on behalf of a primary administrator of a management service 115. The user data 117 can identify secondary administrator privileges 119 for a user that is designated as a secondary administrator. One or more one or more secondary administrator privileges 119 can be specified for a user that outlines what actions the user is empowered to take on behalf of a primary administrator. For example, the secondary administrator privileges 119 can specify that a secondary administrator is authorized to enable certain profiles, settings, and compliance rules but is not authorized to enable others. A primary administrator may only authorize a secondary administrator to provide access to certain enterprise resources, such as a guest Wi-Fi network, but may not authorize the secondary administrator to provide access to a private enterprise network.

Additionally, the secondary administrator privileges 119 can specify temporal restrictions on actions that a secondary administrator can take. For example, the secondary administrator privileges 119 can specify that access to an enterprise resource given by a secondary administrator expire after a specified time period.

The sandboxed environment 121 represents an environment within an enterprise directory where temporary users created by a secondary administrator are assigned. The sandboxed environment 121 can represent a separate organizational group with a user directory where user accounts that are created expire after a specified time period. The sandboxed environment 121 can also include a group of users within an enterprise directory that lack access to all enterprise resources and that can only access those resources that are made available to temporary users or visitors.

The sandboxed environment 121 can also include profiles, policies, and other data that can be provided to a temporary client device 107 once the temporary client device 107 is enrolled as a managed device with the management service 115. For example, the sandboxed environment 121 can include a temporary user credential to access a Wi-Fi network of the enterprise. The sandboxed environment 121 can also specify which services or resources within the enterprise that temporary users can be granted access. For example, the sandboxed environment 121 can specify that a temporary user can be granted access to certain file sharing areas or workspaces within an enterprise file sharing service but not others.

Accordingly, the sandboxed environment 121 can include temporary user data 123. Temporary user data 123 can contain data associated with temporary user accounts that can be created by a secondary administrator on behalf of a primary administrator and/or the management service 115. Temporary user data 123 can include credentials associated with a temporary user account. Temporary user data 123 can include credentials, configuration profiles, certificates, and other data that can be assigned to a temporary user account.

Temporary user data 123 can also include a temporary credential that is generated by a management component 131 running on a managed client device 106 assigned to a secondary administrator who creates a temporary user account as delegated by the primary administrator. Temporary user data 123 can further include a secure token generated by the management component 131 running on a temporary client device 107 that is assigned to a temporary user. The secure token can be generated by the temporary client device 107 during a token exchange conducted with the managed client device 106 when the secondary administrator creates the temporary user account. The secure token can be provided to the management service 115 by the management component 131 running on the managed client device 106. The temporary client device 107 can provide the secure token and/or a temporary credential generated by the managed client device 106 to the management service 115 along with a request to enroll the temporary client device 107 as a managed device. The management service 115 can validate the secure token before enrolling the temporary client device 107 with the management service 115.

The managed client device 106 is representative of a plurality of client devices that can be coupled to the network 109. The managed client device 106 can comprise a computing device. Such a computing device can be embodied in the form of a desktop computer, a laptop computer, a personal digital assistant, a cellular telephone, a smartphone, or any other device with like capability. The managed client device 106 can include a display that comprises, for example, one or more devices such as liquid crystal display (LCD) displays, organic light emitting diode (OLED) displays, or other types of display devices.

The managed client device 106 can be configured to execute various applications, such as a management component 131. The management component 131 can be executed by the managed client device 106 upon startup of the managed client device 106. The management component 131 can also be executed as a background process by the managed client device 106. The management component 131 can be installed with elevated privileges on the managed client device 106 and have elevated rights to install profiles, certificates and/or oversee the operation of the managed client device 106 on behalf of the management service 115. The management component 131 can be installed by a user and/or device administrator and facilitate access to user data 117 by a user of the managed client device 106. For example, the management component 131 can be executed by a user to facilitate provisioning of a device and/or configuration of software to facilitate access to user data 117 and/or other enterprise resources.

The temporary client device 107 is representative of a plurality of client devices that can be coupled to the network 109. The temporary client device 107 can comprise a computing device. Such a computing device can be embodied in the form of a desktop computer, a laptop computer, a personal digital assistant, a cellular telephone, a smartphone, or any other device with like capability. The temporary client device 107 can include a display that comprises, for example, one or more devices such as liquid crystal display (LCD) displays, organic light emitting diode (OLED) displays, or other types of display devices.

The temporary client device 107 represents a device that can be associated with a temporary user or a visitor that can be configured to execute various applications, such as a management component 131. The management component 131 can be installed onto a temporary client device 107 by a user who wishes to enroll the temporary client device 107 as a managed device with the management service 115. The management component 131 can be executed by the temporary client device 107 upon startup of the temporary client device 107. The management component 131 can also be executed as a background process by the temporary client device 107. The management component 131 can be installed with elevated privileges on the temporary client device 107 and have elevated rights to install profiles, certificates and/or oversee the operation of the temporary client device 107 on behalf of the management service 115. The management component 131 can be installed by a user and/or device administrator and facilitate access to user data 117 by a user of the temporary client device 107. For example, the management component 131 can be executed by a user to facilitate provisioning of a device and/or configuration of software to facilitate access to user data 117 and/or other enterprise resources.

A managed client device 106 associated with a secondary administrator can communicate with a temporary client device 107 to facilitate enrollment of the temporary client device 107 as a managed device as well as creation of temporary user credentials for a temporary user associated with the temporary client device 107. A temporary user can correspond to a visitor or a user account that can be created by a secondary administrator delegated by a primary administrator. The temporary user account can be created with a limited set of privileges relative to a user account associated with the enterprise, such as that of an employee. The limited set of privileges that can be assigned to the temporary user can be specified by the secondary administrator privileges 119 of the secondary administrator creating the temporary user account.

In some examples, a secondary administrator can utilize an application executed by the managed client device 106, such as the management component 131, to create a temporary user account. The temporary user account can be created within the sandboxed environment 121. The sandboxed environment 121 can represent a user group within an enterprise directory that is created for temporary users. The user group can be created separate from a user group associated with other users that have access to enterprise resources, such as employees, contractors, and administrators The sandboxed environment 121 can be associated with a limited set of privileges and access rights so that temporary users are prevented from accessing sensitive enterprise resources that are available to other users within the enterprise directory. In some implementations, the sandboxed environment 121 can be a separate user directory from the enterprise user directory.

Figure 2:
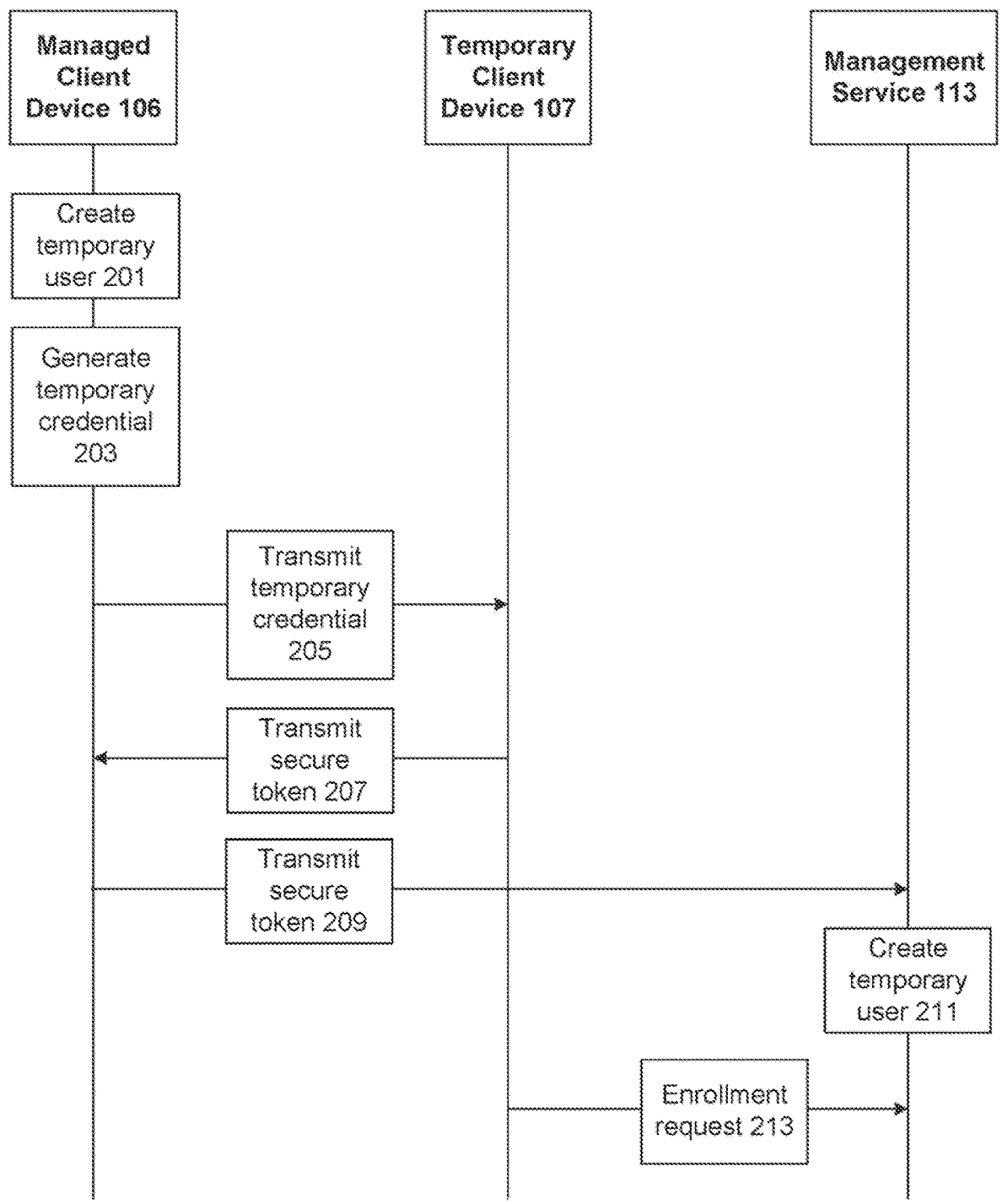
FIG. 2 is a sequence diagram illustrating one example of functionality implemented as portions of an application executed in a computing environment in the networked environment of FIG. 1 according to various embodiments of the present disclosure.

To illustrate a scenario, reference is made to FIG. 2, which illustrates a sequence diagram that shows how a secondary administrator can create a temporary user account through which a temporary user can enroll a temporary client device 107 as a managed device with the management service 115. In one example, a secondary administrator can create a temporary user account to provide temporary access to an intranet, a Wi-Fi network, a file sharing service, a document management system, or other services associated with an enterprise and to which a secondary administrator has been permitted to grant access by a primary administrator. The temporary user accounts can be provided access to configuration profiles, settings, compliance rules, or other data that a primary administrator has authorized a secondary administrator to provide to temporary users. Accordingly, the sequence diagram of FIG. 2 illustrates a scenario in which a secondary administrator can generate a temporary user account and provision a temporary client device 107 without requiring intervention by a primary user.

Therefore, at step 201, the management component 131 running on a managed client device 106 can obtain a request to create a temporary user account. The request can be submitted by a user utilizing a feature within the management component 131 or another application running on the managed client device 106. In one example, the request can be generated through a browser user interface using a web-based application accessible to the user. In this case, the request can be generated at the management service 115, for example. The request to create a temporary user can include identifying information about the temporary user, such as an email address, name, phone number, whether the user is a visitor to a physical location of the enterprise, or other identifying information.

At step 203, the management component 131 running on the managed client device 106 can generate a temporary credential for the temporary user. The temporary credential can include a username/password pair, a unique or one-time-use link, a certificate, a profile, a token, or another type of credential utilized by the management service 115 to authenticate a user account. The management component 131 can generate a temporary password that the temporary user can utilize a single time before the management service 115 requires the temporary user to reset the password. In another example, the credential can comprise a magic link, or a one-time-use link that the temporary user can follow to authenticate with the management service 115 and continue setup of a temporary user account.

In some examples, the management component 131 can request the temporary credential to be generated by the management service 115. The management component 131 running on the managed client device 106 can request the management service 115 to generate a temporary credential for a temporary user by authenticating the authority of a secondary administrator assigned to the managed client device 106. The request can include the identifying information associated with the temporary user. In response to authenticating the secondary administrator, the management service 115 can generate the temporary credential for the temporary user. In some examples, the management service 115 can verify or validate the identifying information associated with the temporary user against a database of identifying information that is pre-authorized or banned from being assigned a temporary credential.

At step 205, the management component 131 can provide the temporary credential to a temporary client device 107 associated with the temporary user. The temporary credential can be provided to temporary client device 107 using a peer to peer communication protocol. For example, the managed client device 106 can communicate the credential using Bluetooth, Wi-Fi, or by generating a quick response code or a barcode in which the temporary credential can be embedded. The temporary credential can also comprise an OAuth token or a certificate generated by a certificate authority that can provide the certificate to the managed client device 106 in response to a request from the management component 131.

At step 207, in response to receiving the temporary credential, the management component 131 running on the temporary client device 107 can generate a secure token that uniquely identifies the temporary client device 107 and/or a temporary user. The secure token can later be provided to the management component 131 running on the managed client device 106, which can in turn provide the secure token along with identifying information about the temporary client device 107 or the temporary user to the management service 115. The management service 115 can store the secure token in association with the identifying information about the temporary client device 107 or temporary user to facilitate later enrollment of the temporary client device 107 as a managed device with the management service 115.

At step 209, the management component 131 running on the managed client device 106 can provide the secure token along with identifying information about the temporary client device 107 or the temporary user to the management service 115. The management service 115 can store the secure token in association with the identifying information about the temporary client device 107 or temporary user to facilitate later enrollment of the temporary client device 107 as a managed device with the management service 115. The management component 131 running on the managed client device 106 can also identify the requested entitlements for the temporary user account. The requested entitlements can comprise the enterprise resources to which the secondary administrator has designated for access for the temporary user. For example, the request can specify that the secondary administrator granted access to a file sharing service, a network, or other enterprise resources to the temporary user.

At step 211, the management service 115 can create the temporary user account in the sandboxed environment 121. The management service 115 can create the temporary user account in the sandboxed environment 121. The temporary user account can identify the entitlements specified by the secondary administrator for the temporary user.

At step 213, the management component 131 running on the temporary client device 107 can transmit an enrollment request to the management service 115. The temporary user can be asked or otherwise prompted to enroll the temporary client device 107 with the management service 115 to access the enterprise resources to which the secondary administrator has granted access. The enrollment request can be generated by the management component 131 and include the temporary credential and/or secure token, which can be validated by the management service 115. In response to receiving the enrollment request, the management service 115 can install profiles, policies, certificates, or other data required by the management service 115 to manage the temporary client device 107.

Figure 3:
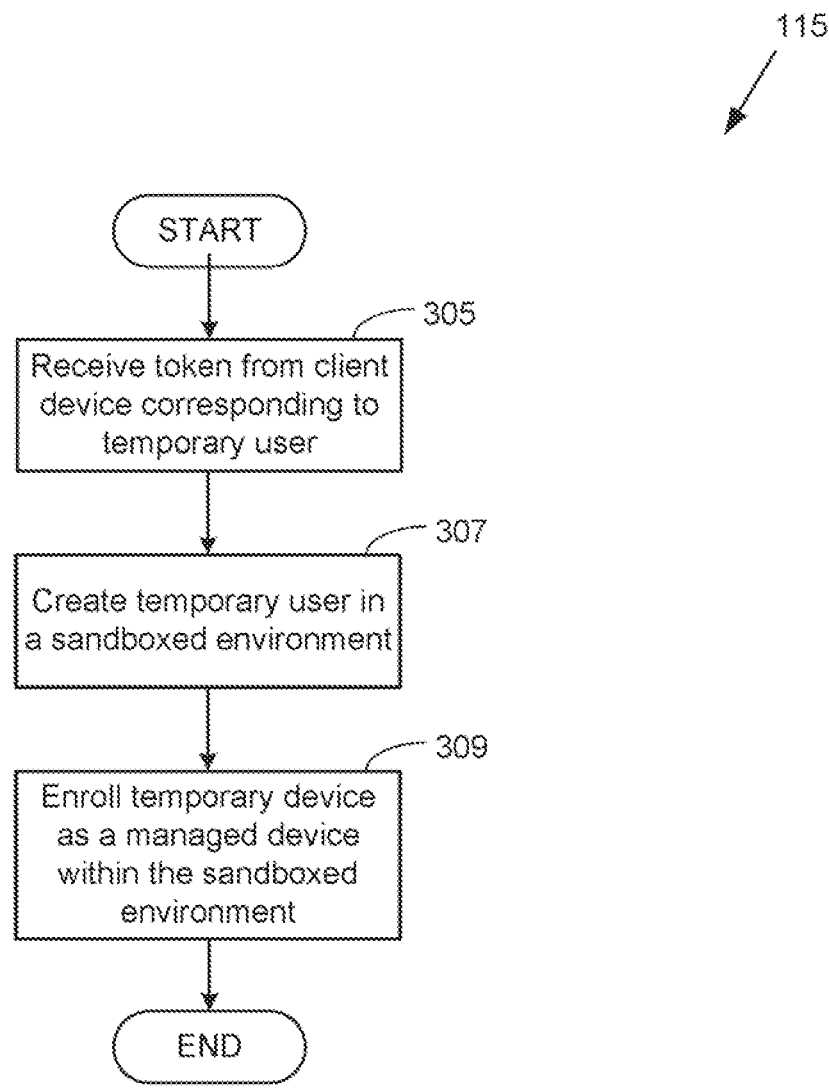
FIG. 3 is a flowchart illustrating one example of functionality implemented as portions of an application executed in a computing environment in the networked environment of FIG. 1 according to various embodiments of the present disclosure.

Referring next to FIG. 3, shown is a flowchart that provides one example of the operation of a portion of the management service 115 according to various embodiments. It is understood that the flowchart of FIG. 3 provides merely an example of the many different types of functional arrangements that can be employed to implement the operation of the portion of the management service 115. As an alternative, the flowchart of FIG. 3 can be viewed as depicting an example of elements of a method implemented in the computing environment 103 according to one or more embodiments. Additionally, it should be appreciated that the functionality shown as implemented by the management service 115 can be implemented by other services or applications.

The flowchart of FIG. 3 assumes that a secondary administrator has been delegated with secondary administrator privileges 119. A primary administrator can specify which profiles, settings, policies, credentials, or other privileges that a secondary administrator can grant to temporary users, which are stored as secondary administrator privileges 119 in association with a user account. The flowchart of FIG. 3 also assumes that a secondary administrator has created a temporary user account on the management component 131 running on a managed client device 106, which has in turn performed a token exchange with a temporary client device 107 associated with a temporary user.

Therefore, at step 305, the management service 115 can receive a secure token from a managed client device 106. As noted above, the management component 131 running on a temporary client device 107 can generate a secure token that uniquely identifies the temporary client device 107 and/or a temporary user in response to receiving a temporary credential from management component 131 running on the managed client device 106.

The secure token can be provided to the management component 131 running on the managed client device 106, which can in turn provide the secure token along with identifying information about the temporary client device 107 or the temporary user to the management service 115. The management service 115 can store the secure token in association with the identifying information about the temporary client device 107 or temporary user to facilitate later enrollment of the temporary client device 107 as a managed device with the management service 115.

At step 307, the management service 115 can create a temporary user account in the sandboxed environment 121. The secure token can include identifying information about the temporary user identify the requested entitlements for the temporary user account. The requested entitlements can comprise the enterprise resources to which the secondary administrator has designated for access for the temporary user. For example, the request can specify that the secondary administrator granted access to a file sharing service, a network, or other enterprise resources to the temporary user. Accordingly, the management service 115 can create the temporary user account in the sandboxed environment 121. The management service 115 can create the temporary user account in the sandboxed environment 121. The temporary user account can identify the entitlements specified by the secondary administrator for the temporary user.

At step 309, the management service 115 can enroll a temporary client device 107 as a managed device. The temporary user can be asked or otherwise prompted to enroll the temporary client device 107 with the management service 115 to access the enterprise resources to which the secondary administrator has granted access. The enrollment request can be generated by the management component 131 and include the temporary credential and/or secure token, which can be validated by the management service 115. In response to receiving the enrollment request, the management service 115 can install profiles, policies, certificates, or other data required by the management service 115 to manage the temporary client device 107. Thereafter, the process proceeds to completion.

Figure 4:
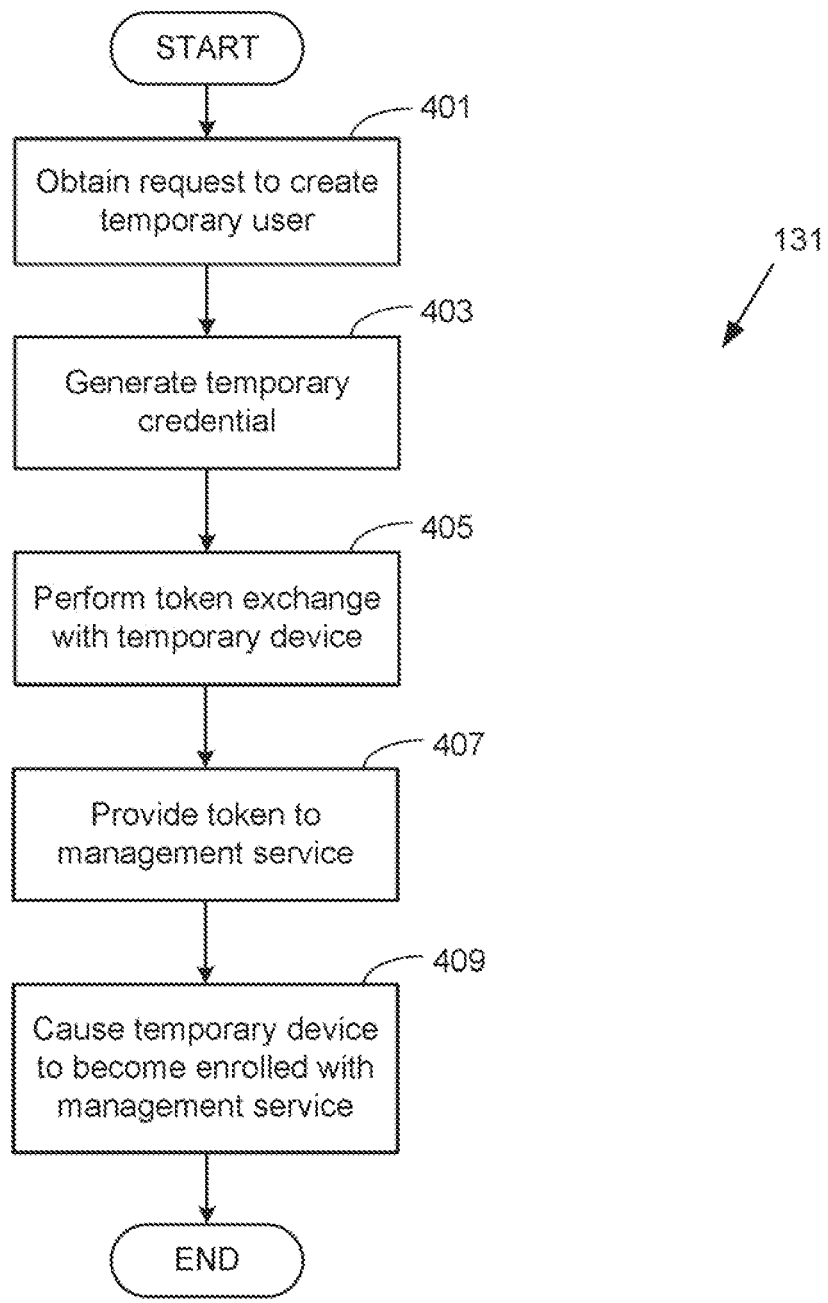
FIG. 4 is a flowchart illustrating one example of functionality implemented as portions of an application executed in a computing environment in the networked environment of FIG. 1 according to various embodiments of the present disclosure.

Referring next to FIG. 4, shown is a flowchart that provides one example of the operation of a portion of the management component 131 according to various embodiments. It is understood that the flowchart of FIG. 4 provides merely an example of the many different types of functional arrangements that can be employed to implement the operation of the portion of the management component 131. Additionally, it should be appreciated that the functionality shown as implemented by the management component 131 can be implemented by other services or applications.

First, at step 401, the management component 131 running on a managed client device 106 can obtain a request to create a temporary user account. The request can be submitted by a user utilizing a feature within the management component 131 or another application running on the managed client device 106. In one example, the request can be generated through a browser user interface using a web-based application accessible to the user. In this case, the request can be generated at the management service 115, for example. The request to create a temporary user can include identifying information about the temporary user, such as an email address, name, phone number, whether the user is a visitor to a physical location of the enterprise, or other identifying information.

At step 403, the management component 131 running on the managed client device 106 can generate a temporary credential for the temporary user. The temporary credential can include a username/password pair, a unique or one-time-use link, a certificate, a profile, a token, or another type of credential utilized by the management service 115 to authenticate a user account. The management component 131 can generate a temporary password that the temporary user can utilize a single time before the management service 115 requires the temporary user to reset the password. In another example, the credential can comprise a magic link, or a one-time-use link that the temporary user can follow to authenticate with the management service 115 and continue setup of a temporary user account.

In some examples, the management component 131 can request the temporary credential to be generated by the management service 115. The management component 131 running on the managed client device 106 can request the management service 115 to generate a temporary credential for a temporary user by authenticating the authority of a secondary administrator assigned to the managed client device 106. The request can include the identifying information associated with the temporary user. In response to authenticating the secondary administrator, the management service 115 can generate the temporary credential for the temporary user. In some examples, the management service 115 can verify or validate the identifying information associated with the temporary user against a database of identifying information that is pre-authorized or banned from being assigned a temporary credential.

At step 405, the management component 131 can perform a token exchange with the temporary client device 107. For example, the management component 131 can provide the temporary credential to a temporary client device 107 associated with the temporary user. The temporary credential can be provided to temporary client device 107 using a peer to peer communication protocol. For example, the managed client device 106 can communicate the credential using Bluetooth, Wi-Fi, or by generating a quick response code or a barcode in which the temporary credential can be embedded. The temporary credential can also comprise an OAuth token or a certificate generated by a certificate authority that can provide the certificate to the managed client device 106 in response to a request from the management component 131.

In response to receiving the temporary credential, the management component 131 running on the temporary client device 107 can generate a secure token that uniquely identifies the temporary client device 107 and/or a temporary user. The secure token can later be provided to the management component 131 running on the managed client device 106, which can in turn provide the secure token along with identifying information about the temporary client device 107 or the temporary user to the management service 115. The management service 115 can store the secure token in association with the identifying information about the temporary client device 107 or temporary user to facilitate later enrollment of the temporary client device 107 as a managed device with the management service 115.

At step 407, the management component 131 running on the managed client device 106 can provide the secure token along with identifying information about the temporary client device 107 or the temporary user to the management service 115. The management service 115 can store the secure token in association with the identifying information about the temporary client device 107 or temporary user to facilitate later enrollment of the temporary client device 107 as a managed device with the management service 115. The management component 131 running on the managed client device 106 can also identify the requested entitlements for the temporary user account. The requested entitlements can comprise the enterprise resources to which the secondary administrator has designated for access for the temporary user. For example, the request can specify that the secondary administrator granted access to a file sharing service, a network, or other enterprise resources to the temporary user.

At step 409, the management component 131 can cause the temporary client device 107 to become enrolled as a managed device with the management service 115. The temporary user can be asked or otherwise prompted to enroll the temporary client device 107 with the management service 115 to access the enterprise resources to which the secondary administrator has granted access. The enrollment request can be generated by the management component 131 on the temporary client device 107 and include the temporary credential and/or secure token, which can be validated by the management service 115. In response to receiving the enrollment request, the management service 115 can install profiles, policies, certificates, or other data required by the management service 115 to manage the temporary client device 107. Thereafter, the process can proceed to completion.

Although the management component 131, management service 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 3-4 show an example of the functionality and operation of an implementation of portions of the management component 131, management service 115, or other application or services. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIG. 3-4 show a specific order of execution, it is understood that the order of execution may differ from that which is depicted. For example, the order of execution of two or more blocks may be scrambled relative to the order shown. Also, two or more blocks shown in succession in FIGS. 3-4 can be executed concurrently or with partial concurrence. Further, in some embodiments, one or more of the blocks shown in FIGS. 3-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the management component 131 or management service 115, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the management component 131, management service 115, etc., can be implemented and structured in a variety of ways. For example, one or more applications described can be implemented as modules or components of a single application. Further, one or more applications described herein may be executed in shared or separate computing devices or a combination thereof. For example, a plurality of the applications described herein may execute in the same computing device and/or managed client device 106, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

What is claimed is:

1. A non-transitory computer-readable medium embodying instructions executable by at least one processor, the instructions causing the at least one processor to at least:
   identify a user account associated with a first client device, wherein the first client device is enrolled as a managed device with a management service;
   determine that the user account is designated as a secondary administrator for the management service, wherein the secondary administrator is associated with privileges to onboard a temporary user in a sandboxed environment;
   receive a unique token from the first client device, wherein the first client device performs a token exchange with a second client device, wherein the first client device provides a temporary user credential to the second client device and the second client device provides a unique token to the first client device, the unique token being associated with a request to create the temporary user account associated with the second client device;
   create the temporary user account in the sandboxed environment in a user directory; and
   enroll the second client device as a managed device with the management service.

2. The non-transitory computer-readable medium of claim 1, wherein the temporary user credential is created by a management component running on the first client device.

3. The non-transitory computer-readable medium of claim 2, wherein the instructions generate a user credential for the temporary user account in a directory service associated with an enterprise and provide the user credential to the management component running on the first client device.

4. The non-transitory computer-readable medium of claim 3, wherein the first client device provides the user credential to the second client device via a peer-to-peer communication.

5. The non-transitory computer-readable medium of claim 2, wherein the management component running on the first client device provides the unique token to the management service.

6. The non-transitory computer-readable medium of claim 5, wherein the instructions enroll the second client device as a managed device with the management service in an instance in which an enrollment request is received from the second client device that includes the unique token, wherein the management service verifies the unique token based upon a previously received unique token from the first client device.

7. The non-transitory computer-readable medium of claim 6, wherein the instructions cause at least one of a configuration profile, compliance policy, or an application to be installed on the second client device.

8. A system, comprising:
at least one computing device; and
an application executable by a hardware processor of the at least one computing device to cause the hardware processor to at least:
identify a user account associated with a first client device, wherein the client device is enrolled as a managed device with a management service;
determine that the user account is designated as a secondary administrator for the management service, wherein the secondary administrator is associated with privileges to onboard a temporary user in a sandboxed environment;
receive a unique token from the first client device, wherein the first client device performs a token exchange with a second client device, wherein the first client device provides a temporary user credential to the second client device and the second client device provides a unique token to the first client device, the unique token being associated with a request to create the temporary user account associated with the second client device;
create the temporary user account in the sandboxed environment in a user directory; and
enroll the second client device as a managed device with the management service.

9. The system of claim 8, wherein the temporary user credential is created by a management component running on the first client device.

10. The system of claim 9, wherein the application generates a user credential for the temporary user account in a directory service associated with an enterprise and provide the user credential to the management component running on the first client device.

11. The system of claim 10, wherein the first client device provides the user credential to the second client device via a peer-to-peer communication.

12. The system of claim 10, wherein the management component running on the first client device provides the unique token to the management service.

13. The system of claim 12, wherein the application enrolls the second client device as a managed device with the management service in an instance in which an enrollment request is received from the second client device that includes the unique token, wherein the management service verifies the unique token based upon a previously received unique token from the first client device.

14. The system of claim 8, wherein the application causes at least one of a configuration profile, compliance policy, or an application to be installed on the second client device.

15. A method, comprising:
identifying a user account associated with a first client device, wherein the client device is enrolled as a managed device with a management service;
determining that the user account is designated as a secondary administrator for the management service, wherein the secondary administrator is associated with privileges to onboard a temporary user in a sandboxed environment;
receiving a unique token from the first client device, wherein the first client device performs a token exchange with a second client device, wherein the first client device provides a temporary user credential to the second client device and the second client device provides a unique token to the first client device, the unique token being associated with a request to create the temporary user account associated with the second client device;
creating the temporary user account in the sandboxed environment in a user directory; and
enrolling the second client device as a managed device with the management service.

16. The method of claim 15, wherein the temporary user credential is created by a management component running on the first client device.

17. The method of claim 16, further comprising generating a user credential for the temporary user account in a directory service associated with an enterprise and provide the user credential to the management component running on the first client device.

18. The method of claim 17, wherein the first client device provides the user credential to the second client device via a peer-to-peer communication.

19. The method of claim 16, wherein the management component running on the first client device provides the unique token to the management service.

20. The method of claim 19, further comprising enrolling the second client device as a managed device with the management service in an instance in which an enrollment request is received from the second client device that includes the unique token, wherein the management service verifies the unique token based upon a previously received unique token from the first client device.

* * * * *